(12) United States Patent
Tordella

(10) Patent No.: US 8,260,797 B2
(45) Date of Patent: Sep. 4, 2012

(54) MULTIPLE FORM POPULATION SYSTEM AND METHOD

(75) Inventor: Joseph R. Tordella, Egg Harbor Township, NJ (US)

(73) Assignee: Joseph R. Tordella, Egg Harbor Township, NJ (US)

( * ) Notice: Subject to any disclaimer, the term of this patent is extended or adjusted under 35 U.S.C. 154(b) by 356 days.

(21) Appl. No.: 12/407,017

(22) Filed: Mar. 19, 2009

(65) Prior Publication Data

US 2010/0241642 A1     Sep. 23, 2010

(51) Int. Cl.
 *G06F 17/20* (2006.01)
 *G06F 17/30* (2006.01)

(52) U.S. Cl. ............... 707/758; 707/796; 707/804

(58) Field of Classification Search ............ 707/758
 See application file for complete search history.

(56) References Cited

U.S. PATENT DOCUMENTS

| | | | | |
|---|---|---|---|---|
| 2002/0016721 A1* | 2/2002 | Mason et al. | | 705/3 |
| 2002/0173994 A1* | 11/2002 | Ferguson, III | | 705/4 |
| 2003/0037018 A1* | 2/2003 | Entwistle | | 706/48 |
| 2004/0122717 A1* | 6/2004 | Hancock | | 705/4 |
| 2004/0205533 A1* | 10/2004 | Lopata et al. | | 715/507 |
| 2005/0209903 A1* | 9/2005 | Hunter et al. | | 705/9 |
| 2006/0095298 A1* | 5/2006 | Bina | | 705/2 |
| 2007/0162323 A1* | 7/2007 | Gorham | | 705/9 |
| 2007/0255581 A1* | 11/2007 | Otto et al. | | 705/1 |
| 2008/0120257 A1* | 5/2008 | Goyal et al. | | 706/12 |
| 2008/0262867 A1* | 10/2008 | Bayne et al. | | 705/2 |
| 2009/0132586 A1* | 5/2009 | Napora et al. | | 707/104.1 |
| 2009/0254369 A1* | 10/2009 | Mohaideen | | 705/3 |

* cited by examiner

*Primary Examiner* — Binh V Ho
(74) *Attorney, Agent, or Firm* — Connolly Bove Lodge & Hutz LLP

(57) ABSTRACT

A method for populating a form includes storing differing forms in a database, each form having at least one information location for entering an item of user information, selecting a first form to provide a first selected form, and entering an item of user information into the information location to provide an entered item of information. Storing the entered item of information in the database to provide a stored item of information, selecting a second form, determining whether the information location of the second selected form corresponds to the information location of first selected form and retrieving the stored item of information to provide a retrieved item of information in accordance with the determining are also included. The retrieved item of information is entered into the information location of the second form to provide a populated form.

13 Claims, 4 Drawing Sheets

MULTIPLE FORM POPULATION SYSTEM AND METHOD

BACKGROUND OF THE INVENTION

1. Field of Invention

This invention relates to the field of form population and, in particular, to the field of populating multiple differing forms.

2. Description of Related Art

People are required to fill out many different forms as they go through life. They may be required to fill out forms for job applications, for insurance, for admission to colleges or other institutions, for credit, to make purchases and for many other reasons. This can be time consuming and tedious. Additionally, many times the people filling out the forms, or the people helping them to fill out the forms, can make errors and inadvertently submit forms that contain the errors.

This can result in the forms being rejected, thus requiring the people to fill out and submit the forms again. This leads to a waste of time for the people filling out the forms, the people helping them, and the people receiving and evaluating the filled out forms. In some cases, if the people filling out the forms are not permitted to try again, it can result in lost opportunities. In cases where the people filling out the form are doctors or other highly trained professionals, very valuable time is wasted.

In many cases the mistakes are made because the people filling out the forms do not have all of the information necessary to fill out the forms accurately. In other cases, the mistakes may be due to carelessness. Even when the people have all of the information necessary, and are very careful, filling out forms can be time consuming, monotonous, or onerous for many other reasons. This is especially true when people must fill out a number of forms, whether it is because they are required to fill out the same form multiple times, or because they must file out multiple different forms.

BRIEF SUMMARY OF THE INVENTION

A method for populating a form in a computer system having a system database, includes storing a plurality of differing forms in the system database, each form of the plurality of forms having at least one information location for entering an item of user information, selecting a first form of the plurality of forms to provide a first selected form, and entering an item of user information into the at least one information location of the first selected form by the user to provide an entered item of information. Storing the entered item of information into the system database to provide a stored item of information, selecting a second form of the plurality of forms to provide a second selected form, determining whether the at least one information location of the second selected form corresponds to the at least one information location of first selected form, and retrieving the stored item of information from the system database to provide a retrieved item of information in accordance with the determining are also included. The retrieved item of information is entered into the at least one information location of the second form to provide a populated form.

The retrieved information is reviewed by the user to determine whether the retrieved information is correct. The retrieved information in the populated form is corrected if the retrieved information is incorrect to provide corrected information. The corrected information is stored in the system database to provide stored corrected information. A third selected form is populated in accordance with the stored corrected information. The populated form is reviewed to determine whether the populated form is complete. Further information is inserted into the populated form in accordance with the reviewing to provide added information. An item of information is retrieved from a database external to the computer system to provide external information, and the external information is entered into the populated form. The external information is stored into the system database. The form is an application form. The form is a job application form. The form is a medical job application form. The medical job application is printed to provide a printed populated application, and further information is entered into the printed populated application by a physician. Detailed information is requested from a user in response to entered user information. Parameter ranges are provided to the user for assisting the user in providing the detailed information. The user is instructed to obtain test results in response to the detailed information.

DETAILED DESCRIPTION OF PREFERRED EMBODIMENTS OF THE INVENTION

Figure 1:
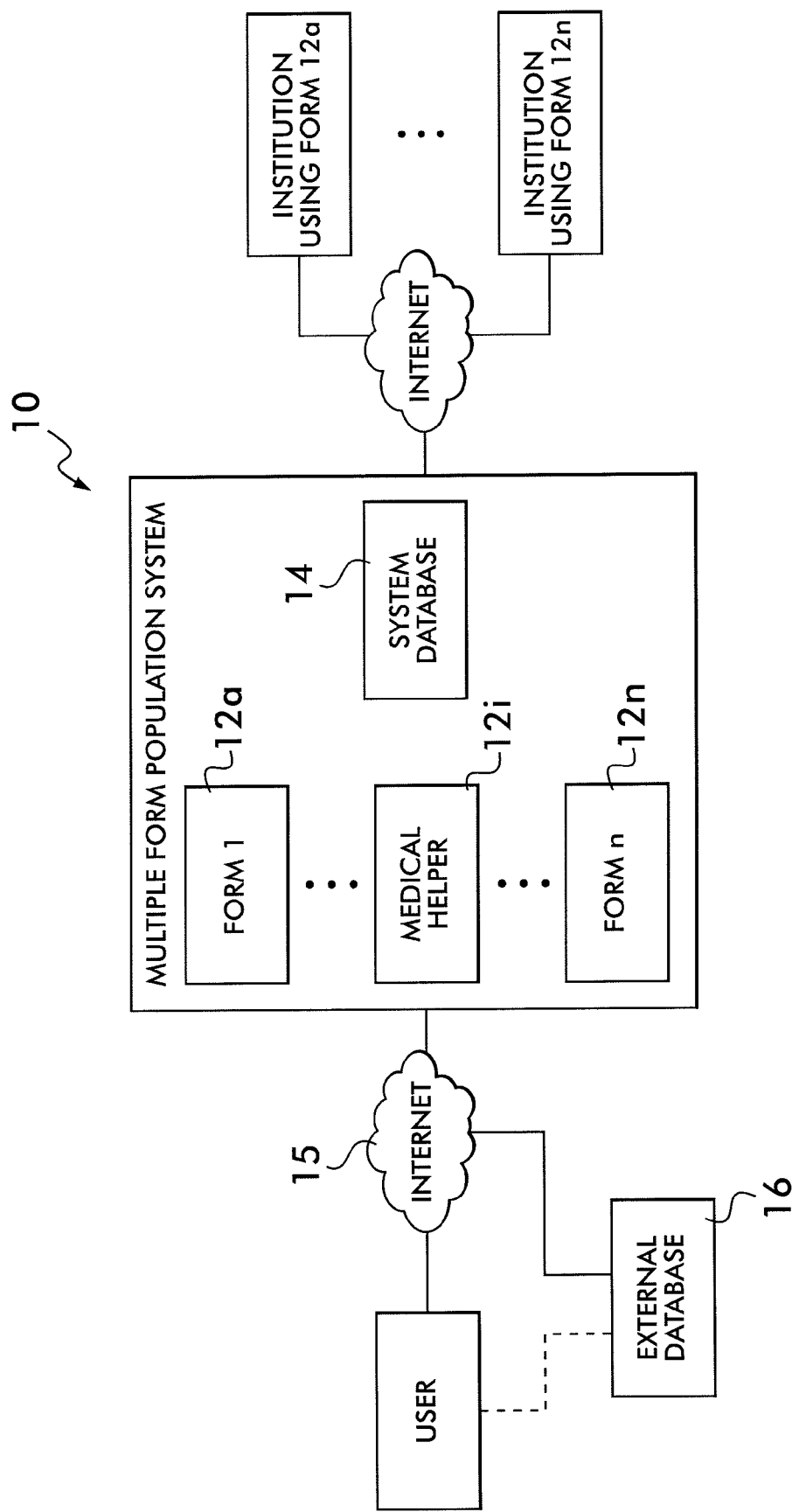
FIG. 1 shows a block diagram representation of an embodiment of a system for practicing the multiple form population method of the present invention.

Referring now to FIG. 1, there is shown a block diagram representation of an embodiment of the multiple form population system and method 10 of the present invention for filling out forms 12a-12n stored in the population system database 14. The multiple form population system 10 can be used by a user to receive user input information for populating information locations within any number of different forms 12a-12n. The multiple form population system 10 can also be used to store the information received from the user into the population system database 14 for later use in populating corresponding locations in other forms 12a-12n.

The user of the multiple form population system 10 can input personal information, and any other kind of information that may be required for filing out the forms 12a-12n, into the multiple form population system 10, for storage and later reuse in populating the same form 12a-12n or other forms 12a-12n within the multiple form population system 10. The information can be provided by the user to the multiple form population system 10 by way of the internet 15, on a client computer loaded with the appropriate client application, or any other method.

In a preferred embodiment of the invention the data entered by the user can be stored into the system database 14 automatically for the user by the form population system 10 after the user enters the information for the first time into the information locations of a form 12a-12n. When the user wants to populate an additional form 12a-12n, the user can select the desired additional form 12a-12n to be populated from the population system database 14, and indicate that it is to be populated. The form population system 10 can find the corresponding information locations within the additional form and insert the information into them after retrieving the information from the system database 14.

The corresponding information can be any kind of information whatsoever. Some examples can include, but are not limited to, the first, middle and last names, height, eye color, hair color, date of birth, home address and employment address of the user. The information will typically be identified by the same or a limited number of different prompts on most forms 12a-12n. The forms 12a-12n will thus typically provide easily located fields identifying the information and providing room for the user to enter the information. For example, fields for a name, an address or a telephone number are common to many forms 12a-12n. Therefore, those skilled in the art can provide software for locating the fields in a form 12a-12n and determining the fields that correspond in other forms 12a-12n. In a preferred embodiment of the invention, where there is a fixed set of possible correct answers, the user can be provided with a menu to select the correct answer. This reduces the number of errors and makes the form 12a-12n easier to fill out.

Thus, for example, a first name field in one form 12a-12n can be easily determined to correspond to the first name field in another form 12a-12n. Furthermore, forms can be scanned in and operated upon by conventional optical character recognition systems to have their information fields located and to have the correspondence of their information fields determined for population by the multiple form population system 10. Thus, new hard copy forms can be added to the multiple form population system 19 and stored in the system database 14.

Previously entered information that is later required to populate a new selected form 12a-12n can be automatically retrieved from the population system database 14, and inserted into the corresponding information locations within the new selected form 12a-12n, once the user indicates the new selected form 12a-12n. The user can then review the new form populated by the form population system 10 to make sure that the information is correct and that the form 12a-12n is complete. The user can then attend to missing or incorrect information and the new entries can be stored in the system database 14.

The new selected form 12a-12n can be an additional copy of the first selected form 12a-12n, or a completely different form 12a-12n. Thus, the selected form 12a-12n can be partially or entirely populated by the multiple form population system 10 automatically. Additionally, the user of the multiple form population system 10 can automatically or on command access any external databases 16 that may contain information useful in populating the selected form 12a-12n. In a preferred embodiment the multiple form population system 10 can be enabled to automatically access any external databases 16 as needed to obtain user information or any other information, with or without notifying the user to obtain reauthorization at the time the form 12a-12n is populated.

The user can directly modify, add or remove information from the population system database 14 or the external databases 16 at any other time, independently of whether a form 12a-12n is being populated. The information modified, added or removed from the databases 14, 16 can be previously entered information or information added at the time the form 12a-12n is being populated.

A partially populated or entirely populated form 12a-12n provided by the multiple form population system 10 can be displayed to the user for review. During the review of the form 12a-12n the user can be permitted to examine the previously entered information that has been inserted by the system 10, and make corrections or modifications if desired. The display of the information also permits the user to determine whether any information required by the form 12a-12n is missing because no previous forms 12a-12n filled out by the user required it, or for any other reasons. If any required information is missing, the user can insert it into the form 12a-12n, and if desired, into the databases 14, 16 for future use.

The forms 12a-12n populated by the multiple form population system 10 can be any types of forms 12a-12n whatsoever. By way of example but not for limitation, the forms 12a-12n can be application forms for jobs, insurance, credit, purchases, forms for physicals that may be required for employment or to purchase insurance, etc.

Thus, in a preferred embodiment of the invention, the forms 12a-12n available within the multiple form population system 10 can include a medical helper form 12i. The medical helper form 12i can be one of any number of different medical forms required for job applications, insurance applications, pre-examination workups, information gathering preliminary to providing medical examinations or services, or for any other purpose. For example, the medical helper form 12i can be a physical examination form required for entry into the armed services.

Figure 2:
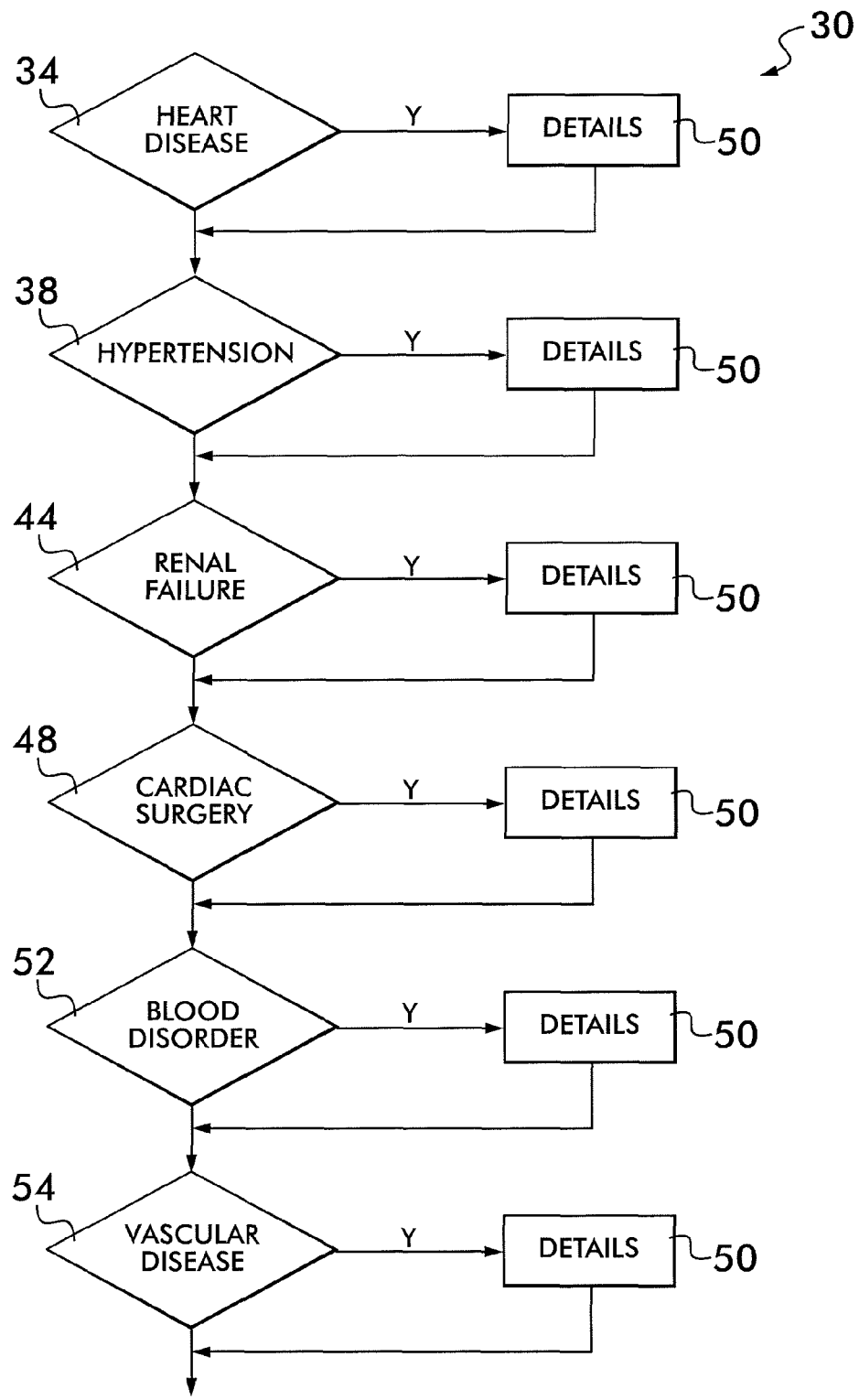
FIG. 2 shows a flow chart representation of an embodiment of a portion of a form population system suitable for use in the multiple form population system of FIG. 1.

Referring now to FIG. 2, there is shown the circulatory system questionnaire portion 30 of a medical helper questionnaire 12i, which can be a preferred embodiment of a form 12a-12n available for population by the form population system 10. The circulatory system questionnaire portion 30 can be used to prompt a user to determine the health of the circulatory system of the user of a medical helper questionnaire 12i, within the multiple, form population system 10, and to receive and store information from the user. The information obtained in this manner using the circulatory system questionnaire portion 30 can be used to populate any other forms 12a-12n for the user as required by the user. The forms populated from this information can be other medical forms, or any other kinds of forms.

Within the circulatory system questionnaire portion 30, a user is prompted by heart disease decision 34 to provide information on whether the user has been diagnosed with any coronary artery disease. If the user responds yes to heart disease decision 34, execution of the circulatory system questionnaire 30 can proceed to the details block 50, where the user can be provided with prompts to determine details of the user's coronary heart disease.

Figure 3:
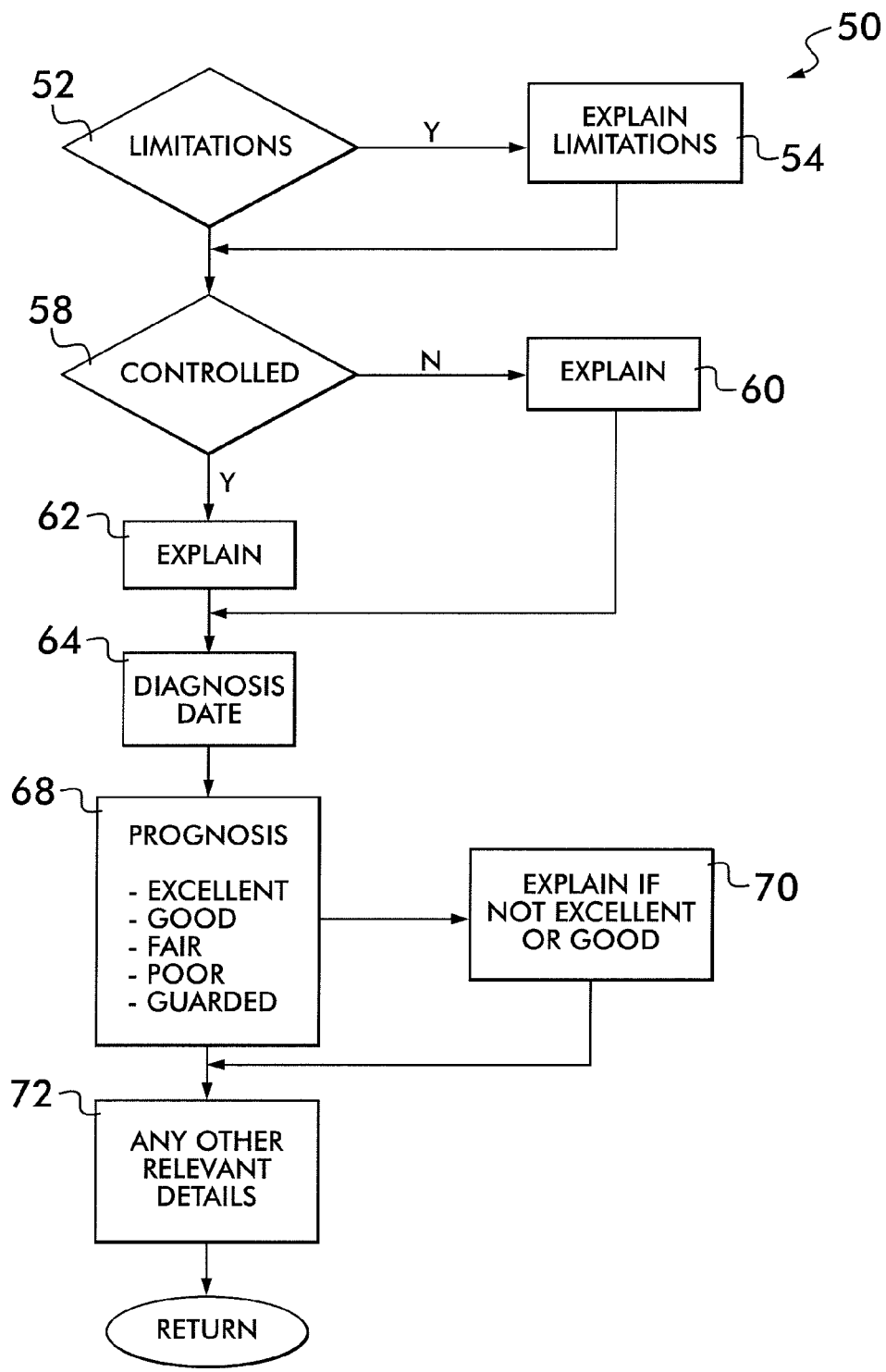
FIG. 3 shows a flow chart representation of an embodiment of a method for obtaining detail information suitable for use in the form population system of FIG. 1.

Referring now to FIG. 3, there is shown a more detailed flow chart representation of the details block 50 of, for example, the circulatory system questionnaire portion 30. Within the details block 50 the user is asked in decision 52 whether there are any limitations imposed upon the user due to the condition that the user has indicated applies. If any limitations are imposed upon the user, as determined by decision 52 within the details block 50, the user is prompted to explain the limitations in block 54.

The user can then be asked by the details block 50 whether the condition has been controlled by medication, by surgery or by any other means in decision 58. If the condition is not controlled the user can explain in block 60. If the condition is controlled, the user is prompted to explain how it is controlled in block 62.

The user can then be instructed in block 64 to enter the diagnosis date of the condition. Additionally, the user can select an excellent, good, fair, poor or guarded prognosis in block 68. If the user does not select a good or excellent prognosis in block 68, the user can be prompted to provide an explanation in block 70. It will be understood by those skilled in the art that any other details can be requested within details block 50, as shown in block 72. Furthermore, any other explanations relevant to any other issues can be required within details block 50, as shown in block 72.

For example, if the user arrives at details block 50 by way of heart disease determination 34 of the circulatory system questionnaire portion 30, the user can be requested to provide the results of a stress test that is no more than one year old along with the medical application by the details block 50. Furthermore, the details block 50 can be modified in any way to make it specific for any other disease or condition.

The details block 50 or any other block in system 10 can provide different ranges of any parameters relevant to a disease or condition for selection by the user in order to prompt the user to provide any information that may be pertinent. The ranges can be ranges of various test results, dosages of medications, or any other kinds of ranges. The population system database 14 of the multiple form population system 10 can also store the names of medications, test result parameters, personal information values such as height, weight, body mass index, or any other items useful for helping the user to use the system 10. Those skilled in the art can provide algorithms for completion a partial entry of information such as the name of medication entered by a user, based upon information stored in the database 14. If a more complicated value, such as body mass index is required, the multiple form population system 10 can prompt the user for information that may be useful for calculating or otherwise determining and storing the value automatically for the user. Relevant stored results can be listed for the user to select, for example by a mouse click, used to complete partial entry by the user, or made available to help the user in any manner known to those skilled in the art.

Returning now to FIG. 2, the user can then be asked whether the user has hypertension by decision 38 of the circulatory system questionnaire portion 30. If the user responds yes to decision 38, execution of the circulatory system questionnaire portion 30 can proceed to details block 50 to receive the details of the user's hypertension, as previously described with respect to an affirmative answer regarding coronary heart disease in decision 34. Thus, an appropriate details block 50 can be provided for any questions or determinations within the system 10. The user can also be prompted to provide current blood pressure values or any other relevant information by details block 50 or by the decision 38 of the circulatory system questionnaire portion 30, whichever may be more convenient.

A determination can then be made whether the user has chronic renal failure in determination 44. If the user indicates that chronic renal failure has been diagnosed, execution of the circulatory system questionnaire 30 can proceed to an appropriate details block 50 to get more detailed information regarding the renal condition. When execution returns from the details block 50, a determination can be made whether the user has cardiac surgery in determination 48. If the user responds in the affirmative, execution of the circulatory system questionnaire portion 30 can proceed to details block 50. The user can also be instructed to provide a stress test which is no more than one year old.

In the same manner, the user can be asked by the circulatory system questionnaire portion 30 whether a blood disorder or other vascular disease has been diagnosed in determinations 52, 54, respectively. If the user responds yes to either determination, execution of the circulatory system questionnaire portion 30 can proceed to details block 50 to obtain the details. Any other questions relevant to the user's circulatory system and also be asked.

Figure 4:
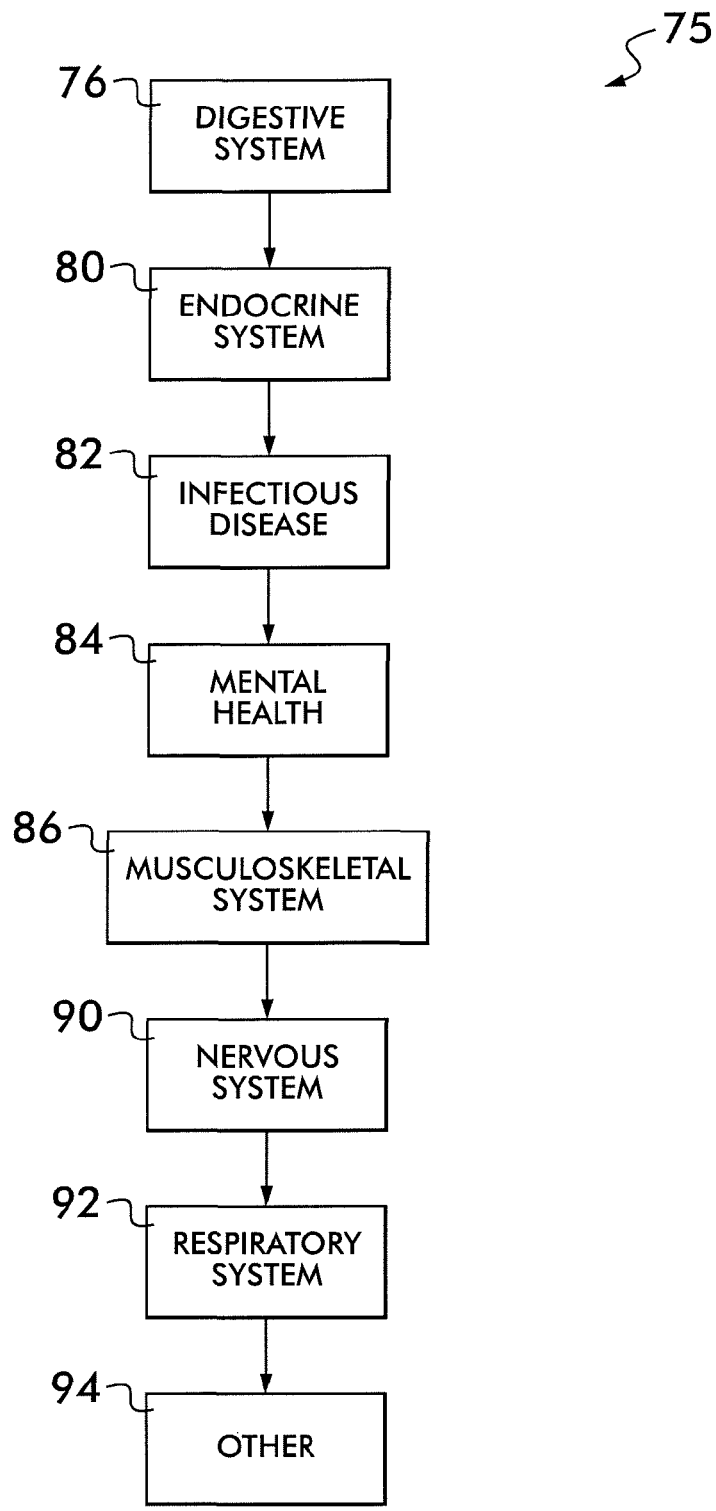
FIG. 4 shows a flow chart representation of an embodiment of a further portion of the form population portion of FIG. 2, suitable for use in the multiple form population system of FIG. 1.

Referring now to FIG. 4, there is shown the medical helper questionnaire 75. The medical helper questionnaire 75 can be a further portion of a medical helper questionnaire system 12*i*, along with the circulatory system questionnaire portion 30, described above. Furthermore, an embodiment of the medical helper questionnaire system 12*i* formed in this manner by the questionnaire portions 30, 75 can be one of any number of questionnaires provided within the form population system 10 of the present invention.

Using the medical helper questionnaire 75, the user can be prompted to enter information regarding any diagnoses with regard to any diseases or medical conditions. For example, a series of determinations within the digestive disorders in block 76 can be provided within the medical helper questionnaire 75 for obtaining information on any digestive diseases the user may have. Additionally, determinations can be made with respect to the user's endocrine system in block 80.

In substantially the same manner as previously described with respect to the circulatory system questionnaire portion 30, execution of the medical helper questionnaire 75 can proceed from the appropriate blocks 76, 80 to the details block 50, if determinations are made that a disease has been diagnosed within block 76, 80. If execution proceeds to details block 50 by way of block 80, determinations can be made with respect to whether the user has thyroid dysfunction or diabetes or any other endocrine disorders within details block 50. Additionally, the user can be prompted to provide TSH levels within the past year if thyroid dysfunction is indicated.

If diabetes has been indicated, the user can be prompted to state whether Type I or Type II has been diagnosed, whether NIIDM or IDDM, and to state the effects on vision and HgbAlc within a period of thirty days if diabetes is indicated in block 80. If the HgbAlc is above a predetermined level, for example ten percent, further testing can be required. Any of the foregoing questions can be asked within the medical helper questionnaire 75 or within the details box 50, as convenient. The user can be provided with ranges to select from and additional information can be requested depending on the range selected.

In block 82 the user can be prompted to provide information on infectious diseases. In one embodiment a user can be provided with a list of significant infectious diseases to check off if they pertain to the user. If the user has been diagnosed as having any significant infectious diseases, as determined in block 82, execution of the medical helper questionnaire 75 can proceed to details block 50.

Similarly, within the medical helper questionnaire 75, determinations can be made with respect to the user's mental system, musculoskeletal system, nervous system or respiratory system. Accordingly, the user can be provided with mental system block 84, musculoskeletal system block 86, nervous system block 90 and respiratory system block 92 within the questionnaire 75. Each of the foregoing blocks can use a details block such as the details block 50 if additional information is required.

In mental system block 84 determinations can be made with respect to psychiatric disorders, depression, attempted suicide, alcohol abuse, drug abuse, loss of memory, or any other relevant issues. Within musculoskeletal system block 86, determinations can be made with respect to any amputations, impaired range of motion, impaired balance or coordination, or any other areas relevant to the musculoskeletal system.

Within nervous system block 90, determinations can be made with respect to epilepsy or other conditions causing seizures, dizziness, unconsciousness, paralysis, or any other relevant issues. Within respiratory system block 92 determinations can be made with respect to whether the user has been diagnosed with asthma. If the user has been diagnosed with asthma PFT results within the past year can be requested in details block 50. The user can also be asked whether any other lung disease or any other respiratory disease has been diagnosed in respiratory system block 92. PFT results, or any other relevant medical test results, can be requested in details block 50, as applicable.

In block 94 of the medical helper questionnaire 75, any other relevant determinations can be made. Additionally, any other details relevant to additional determinations can be requested using details block 50. It will be understood by those skilled in the art that any other determinations can also be made within the medical helper questionnaire 75, and that the user can be prompted to provide details using a details block such as details box 50 for any answers provided. Furthermore, the questions asked within the present invention can be asked in any convenient order.

While the invention has been described in detail and with reference to specific examples thereof, it will be apparent to one skilled in the art that various changes and modifications can be made therein without departing from the spirit and scope thereof.

What is claimed is:

1. A method for populating a form in a computer system having a system database, comprising:
    storing a plurality of differing forms in the system database, each form of the plurality of forms having at least one information location for entering an item of user information;
    selecting a first form of the plurality of forms to provide a first selected form;
    entering an item of user information into the at least one information location of the first selected form by the user to provide an entered item of information;
    providing parameter ranges and requesting detailed information from a user in response to entered user information, wherein the user is instructed to obtain test results in response to the detailed information;
    storing the entered item of information into the system database to provide at least one stored item of information;
    selecting a second form of the plurality of forms to provide a second selected form;
    automatically determining whether the at least one information location of the second selected form corresponds to the at least one information location of first selected form by comparing the at least one information location of the first selected form with the at least one information location of the second selected form;
    only if the at least one information location of the first selected form overlaps with the at least one information location of the second selected form, then:
        automatically retrieving the at least one stored item of information from the system database to provide at least one retrieved item of information; and
        automatically entering the at least one retrieved item of information into the at least one information location of the second form to provide a populated form.

2. The method for populating a form of claim 1, further comprising reviewing the at least one retrieved information by the user to determine whether the at least one retrieved information is correct.

3. The method for populating a form of claim 2, further comprising correcting the at least one retrieved information in the populated form if the at least one retrieved information is incorrect to provide at least one corrected information.

4. The method for populating a form of claim 3, further comprising storing the at least one corrected information in the system database to provide at least one stored corrected information.

5. The method for populating a form of claim 4, further comprising populating a third selected form in accordance with the at least one stored corrected information.

6. The method for populating a form of claim 1, further comprising reviewing the populated form to determine whether the populated form is complete.

7. The method for populating a form of claim 6, further comprising inserting further information into the populated form in accordance with the reviewing to provide added information.

8. The method for populating a form of claim 1, further comprising
    automatically retrieving an item of information from a database external to the computer system to provide external information; and
    automatically entering the external information into the populated form.

9. The method for populating a form of claim 8, further comprising storing the external information into the system database.

10. The method for populating a form of claim 1, wherein the form comprises an application form.

11. The method for populating a form of claim 10, wherein the form comprises a job application form.

12. The method for populating a form of claim 11, wherein the form comprises a medical job application form.

13. The method for populating a form of claim 12, further comprising:
    printing the medical job application form to provide a printed populated application; and
    entering further information into the printed populated application by a physician.

* * * * *